United States Patent
Ogawa et al.

(10) Patent No.: US 9,917,516 B2
(45) Date of Patent: Mar. 13, 2018

(54) DC-DC CONVERTER WITH INPUT VOLTAGE RESPONSIVE LOOKUP TABLE CONTROL

(71) Applicant: KABUSHIKI KAISHA TOSHIBA, Minato-ku (JP)

(72) Inventors: Taichi Ogawa, Tokyo (JP); Takeshi Ueno, Kanagawa (JP); Tetsuro Itakura, Tokyo (JP); Osamu Watanabe, Kanagawa (JP); Takayuki Miyazaki, Tokyo (JP)

(73) Assignee: KABUSHIKI KAISHA TOSHIBA, Minato-Ku (JP)

( * ) Notice: Subject to any disclaimer, the term of this patent is extended or adjusted under 35 U.S.C. 154(b) by 0 days.

(21) Appl. No.: 15/252,838

(22) Filed: Aug. 31, 2016

(65) Prior Publication Data

US 2017/0070140 A1    Mar. 9, 2017

(30) Foreign Application Priority Data

Sep. 4, 2015    (JP) .................................. 2015-174913

(51) Int. Cl.
*H02M 3/157* (2006.01)
*H02M 3/158* (2006.01)
*H02M 1/00* (2006.01)

(52) U.S. Cl.
CPC .... *H02M 3/158* (2013.01); *H02M 2001/0022* (2013.01); *H02M 2001/0054* (2013.01); *Y02B 70/1491* (2013.01)

(58) Field of Classification Search
CPC . H02M 2001/0012; H02M 2001/0022; H02M 1/08; H02M 3/156; H02M 3/157; H02M 3/158

USPC .......................... 323/222, 272, 283, 285, 299
See application file for complete search history.

(56) References Cited

U.S. PATENT DOCUMENTS

| | | | | |
|---|---|---|---|---|
| 7,084,613 | B2 * | 8/2006 | Harris | H02M 3/1584 323/272 |
| 9,450,492 | B1 * | 9/2016 | Bizjak | H02M 3/156 |
| 2007/0210766 | A1 * | 9/2007 | Borowy | H02M 1/32 323/222 |
| 2009/0033308 | A1 * | 2/2009 | Narendra | G06F 1/206 323/299 |
| 2009/0295341 | A1 * | 12/2009 | Nakamura | H02M 3/1588 323/222 |

(Continued)

FOREIGN PATENT DOCUMENTS

JP    3829753    7/2006

*Primary Examiner* — Jeffrey Sterrett
(74) *Attorney, Agent, or Firm* — Oblon, McClelland, Maier & Neustadt, L.L.P.

(57) ABSTRACT

A DC-DC converter including an input, an output, a conversion circuit, and a switch control circuit. The input inputs input voltage. The output outputs output voltage. The conversion circuit a plurality of semiconductor switches, and converts the input voltage to the output voltage by switching operation of one or more semiconductor switches of the plurality of semiconductor switches. The switch control circuit selects one or more semiconductor switches performing the switching operation from the plurality of semiconductor switches based on the input voltage and a predetermined lookup table, and controls the switching operation of the one or more semiconductor switches.

8 Claims, 6 Drawing Sheets

(56) References Cited

U.S. PATENT DOCUMENTS

| | | | | |
|---|---|---|---|---|
| 2010/0079181 A1* | 4/2010 | Barrenscheen | ....... | H02M 3/156 327/175 |
| 2013/0335043 A1* | 12/2013 | He | ........... | H02M 3/04 323/234 |
| 2014/0268954 A1* | 9/2014 | Wei | ........ | H02M 7/217 363/89 |
| 2014/0355314 A1* | 12/2014 | Ryan | ......... | H02M 3/33507 363/21.01 |
| 2016/0254748 A1* | 9/2016 | Schmitz | ........ | H02M 3/156 |
| 2017/0070140 A1* | 3/2017 | Ogawa | ......... | H02M 3/158 |

* cited by examiner

FIG. 1

| Analog value | Digital value (2bit) | Switch to be used |
|---|---|---|
| input voltage ≧ 0.3 | 11 | M11+12 |
| 0.2 ≦ input voltage < 0.3 | 10 | M12 |
| input voltage < 0.2 | 01 | M11 |
| — | 00 | — |

DC-DC CONVERTER WITH INPUT VOLTAGE RESPONSIVE LOOKUP TABLE CONTROL

CROSS-REFERENCE TO RELATED APPLICATIONS

This application is based upon and claims the benefit of priority from Japanese Patent Application No. 2015-174913, filed on Sep. 4, 2015; the entire contents of which are incorporated herein by reference.

FIELD

Embodiments described herein relate generally to a DC-DC converter and power supply device.

BACKGROUND

To reduce power consumption of a DC-DC converter, a method is known which switches a semiconductor switch of the DC-DC converter, although the semiconductor switch may cause power-loss of the DC-DC converter. The power-loss of the semiconductor switch is caused by switching-loss (PSW), conduction-loss (PCON), and driving-loss (PDRI). PSW is substantially directly proportional to the size of the semiconductor switch and the amount of the input current. PCON is inversely proportional to the size of the semiconductor switch. PDRI is substantially directly proportional to the size of the semiconductor switch. Thereby, the power consumption of the semiconductor switch depends on the input current and the size of the semiconductor switch. Therefore, a background DC-DC converter includes a plurality of semiconductor switches whose sizes are different from each other, and the converter switches to the semiconductor switch which consumes the lowest power in accordance with the amount of the current into the switches. Thus, the background DC-DC converter can suppress power consumption.

In the above mentioned method, however, it is necessary to calculate the amount of the current input to the switches. In general, a resistor is connected in series between the DC-DC converter and a load, the voltage across the resistor is measured, and the amount of the current can be acquired. In this method, however, some power consumption at the resistor results because of taking the measurement of the voltage across the resistor.

DETAILED DESCRIPTION

According to one embodiment, a DC-DC converter includes an input, an output, a conversion circuit, and a switch control circuit. The input inputs an input voltage. The output outputs an output voltage. The conversion circuit includes a plurality of semiconductor switches, and converts the input voltage to the output voltage by switching operation of one or more semiconductor switches of the plurality of semiconductor switches. The switch control circuit selects one or more semiconductor switches performing the switching operation from the plurality of semiconductor switches based on the input voltage and a predetermined lookup table, and controls the switching operation of the one or more semiconductor switches.

Various embodiments will be described hereinafter with reference to the accompanying drawings.

The First Embodiment

Figure 1:
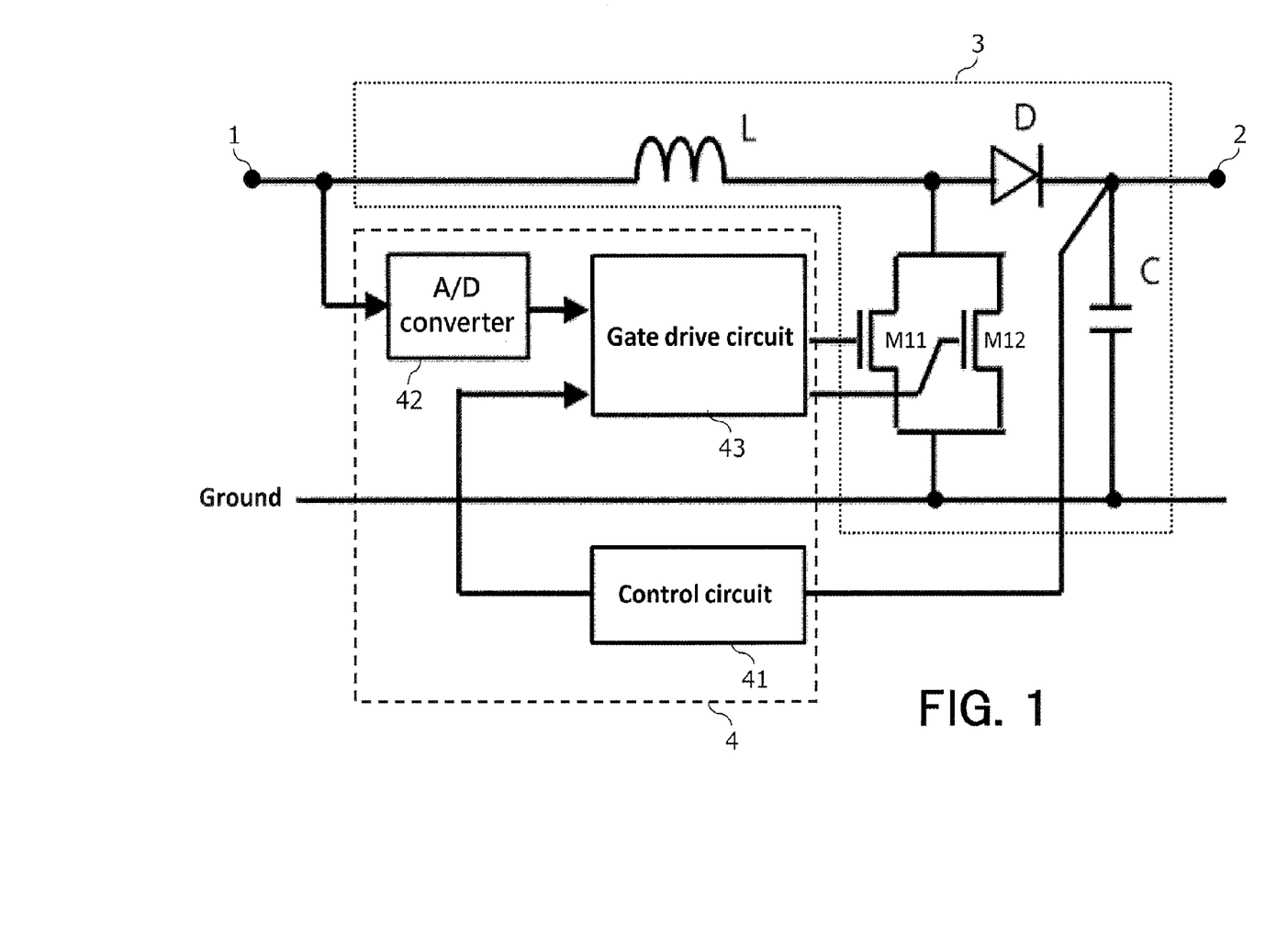
FIG. 1 is a diagram showing an example of a circuit configuration of a DC-DC converter according to a first embodiment.

FIG. 1 is a diagram showing an example of a circuit configuration of a DC-DC converter according to a first embodiment. The DC-DC converter according to this embodiment includes an input 1, an output 2, a conversion circuit 3, and a switch control circuit 4. The conversion circuit 3 includes an inductor L, a diode D, a switch M11, a switch M12, and a capacitor C. The switch control circuit 4 includes a control circuit 41, an A/D converter 42 (analog to digital converter 42), and a gate drive circuit 43. The circuit configuration described in FIG. 1 is one example, so a different configuration can be utilized, or it may include a configuration element not described in FIG. 1. For example, there may be three or more switches, and not only the switch M11 and the switch M12. The conversion circuit 3 may be a voltage step-up circuit or a voltage step-down circuit.

Each component is explained below.

The input 1 is connected to a DC power supply (not illustrated), and inputs the input voltage. The output 2 is connected to a load (not illustrated), and outputs the output voltage to the load. The DC-DC converter according to this embodiment converts the input voltage to a specified output voltage.

The inductor L of the conversion circuit 3 is connected to the input 1 at one end, and to the diode D, the switch M11, and the switch M12 at the other end. An anode of the diode D is connected to the other end of the inductor L. A cathode of the diode D is connected to the output 2 and the capacitor C. Therefore, an electric current can flow from the inductor L to the output 2 and the capacitor C. The switch M11 and the switch M12 are connected in parallel. One end of the switch M11 is grounded and the other end is connected to the other end of the inductor L. The switch M12 is similarly connected. The details of the switches M11, M12 are described below. The capacitor C is connected to the cathode of the diode D and the output 2 at one end, and grounded at the other end. The capacitor C operates as a smoothing capacitor. The conversion circuit 3 including the inductor L, the diode D, the capacitor C, the switch M11, and the switch M12 can convert the input voltage input from the input 1 by switching operation of the switch M11 and the switch M12.

The control circuit 41 of the switch control circuit receives the output voltage, and controls the switching operation of the switch M11 and the switch M12 of the conversion circuit 3 so that the amount of the output voltage becomes a prescribed amount. The gate drive circuit 43 switches ON-OFF of the switches M11, M12. The control circuit 41 controls the ON-OFF of the switches M11, M12 by outputting an ON-OFF control signal of the switches M11, M12 to the gate drive circuit 43.

Figure 2:
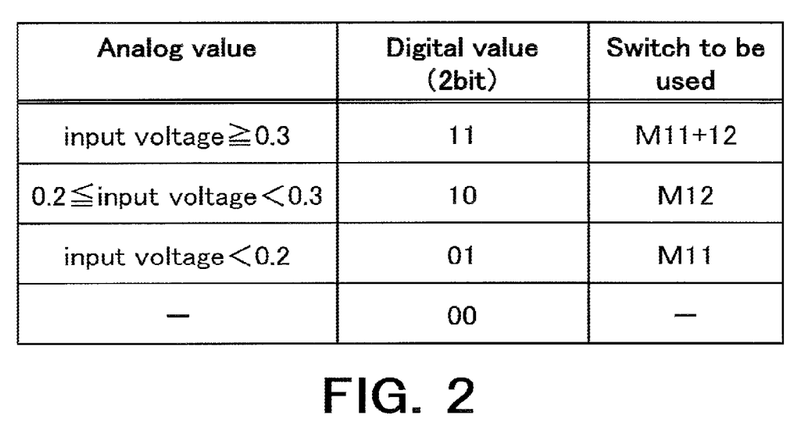
FIG. 2 is a diagram showing relationship between input power (analog values), digital values of each A/D conversion, and the switches to be used.

The A/D converter 42 is connected to the input 1 at one end. The A/D converter 42 converts the input voltage to a digital signal. The digital signal is used for determination of the switch to be used. FIG. 2 is a diagram showing a relationship between input power (analog values), digital values of each A/D conversion, and the switches to be used. In this embodiment, an example of 2 bits of the A/D converter 42 is shown. The analog value is the amount of the voltage of the input unit 1. The A/D converter 42 converts the analog value to the corresponding digital value which is the 2 bit value from 00 to 11, and outputs the digital value.

Because the pattern of the switches to be used is three, "00" is not used in this embodiment. A conversion bit number of the A/D converter 42 is determined in accordance with the switches of the DC-DC converter.

The gate drive circuit 43 includes a correspondence table (lookup table) which indicates correspondence between the digital values and the switches to be used as illustrated in FIG. 2. The gate drive circuit 43 selects the switch to be switched ON-OFF from the switch M11, the switch M12, or both the switch M11 and M12, based on the digital signal from the A/D converter 42 and the lookup table. The selected switch is controlled by the ON-OFF control signal of the control circuit 41. The switch not selected is kept off.

As mentioned above, the switch control circuit 4 switches the switch to be used based on the input voltage from the input 1.

Next, the switches and the power consumption are explained. Both the switch M11 and the switch M12 can be n-type MOSFET switches. It is assumed that the size of the switch M11 and the size of the switch M12 are different. The value of the gate width of the switch M11 is set to WM11. The value of the gate width of the switch M12 is set to WM12. The values of the gate lengths of the switch M11 and the switch M12 are both set to L. WM11 is less than WM12. The DC-DC converter in this embodiment selects the switch to be used by switching to the switch M11, the switch M12, or the both the switch M11 and the switch M12, to suppress power consumption.

Figure 3A:
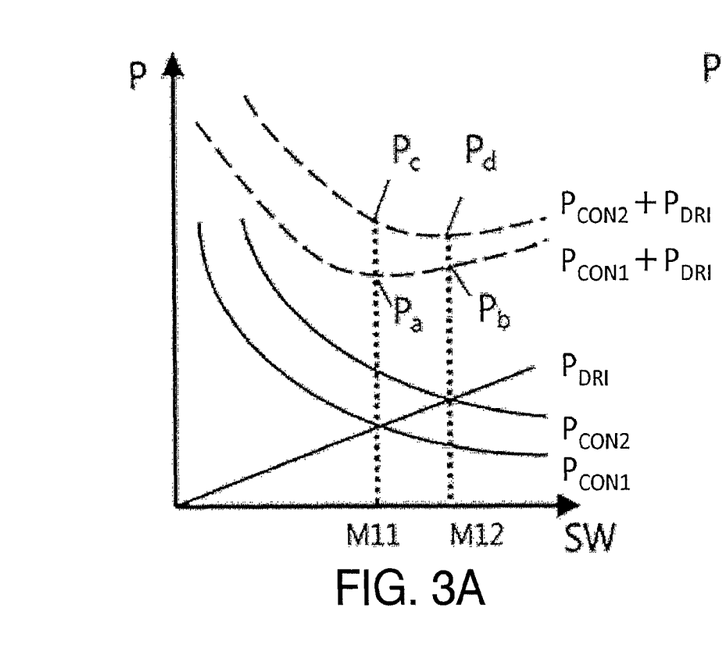
FIGS. 3(A), 3(B) are diagrams explaining the power consumption of the semiconductor switch.
Figure 3B:
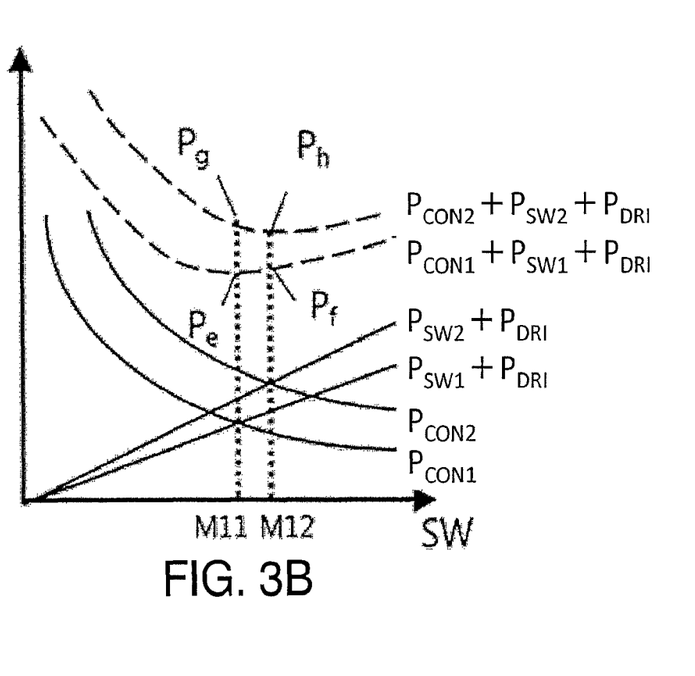

FIGS. 3(A), 3(B) are diagrams explaining the power consumption of a semiconductor switch. The horizontal axis indicates the size. The vertical axis indicates the power consumption. The power consumption of the semiconductor switch is caused by switching-loss (PSW), conduction-loss (PCON), and driving-loss (PDRI). PSW is substantially directly proportional to the size (capacity) of the semiconductor switch and the amount of the input current. PCON is substantially inversely proportional to the size of the semiconductor switch and directly proportional to the amount of the input current. PDRI is substantially directly proportional to the size of the semiconductor switch and does not depend on the input current. FIG. 3(A) is a diagram taking into account PCON and PDRI. FIG. 3(B) is a diagram taking into account PCON, PDRI, and PSW.

The graphs of PCON1 and PCON2 indicated in FIG. 3(A) are those under a condition that the each input current is different, and the input current of PCON2 is more than of PCON1. Since PCON is substantially inversely proportional to the amount of the input current, PCON2 in case of a relatively larger input current consumes a larger power than PCON1. And, since PCON is substantially inversely proportional to the size of the switch, the larger the size of the switch, the smaller the power consumption.

Since PDRI does not depend on the input current, the graph of PDRI is indicated as one graph unlike the graph of PCON. Since PDRI is substantially directly proportional to the size of the switch, the larger size of the switch, the larger the power consumption. Therefore, the power consumption taking into account PCON and PDRI is indicated in the graph of PCON1+PDRI in case of a smaller input current or the graph of PCON2+PDRI in case of a smaller input current shown by broken lines.

According to these two graphs, the power consumption Pa of the switch M11 in a case of a relatively smaller input current is less than the power consumption Pb of the switch M12. Therefore, in a case of the smaller input current, it is more efficient to use the switch M11. On the contrary, the power consumption Pc of the switch M11 in a case of a larger input current is more than the power consumption Pd of the switch M12. Therefore, in a case of the larger input current, it is more efficient to use the switch M12. Thus, when the amount of the input current changes from the smaller value to the larger value, the power consumption caused by the switch can be suppressed by switching the switch to be used from the switch M11 to the switch M12.

A case further taking into account PSW is explained below. In FIG. 3(B), the graph PSW1+PDRI that adds PSW1 in a case of the smaller input current and the graph PSW2+PDRI that adds PSW2 in the case of the smaller input current are further showed instead of the graph of PDRI indicated in FIG. 3(A). Since PSW is substantially directly proportional to the size of the switch as well as PDRI, also with respect to the graphs of PSW1+PDRI and PSW2+PDRI, the larger the size of the switch, the larger the power consumption. Since PSW is substantially directly proportional to the amount of the input current PSW2+PDRI is larger than PSW1+PDRI.

The power consumption taking into account PSW, PCON and PDRI is indicated in the graph of PCON1+PDRI in the case of the smaller input current or the graph of PCON2+PDRI in the case of the larger input current shown by broken lines. According to these two graphs, the power consumption Pe of the switch M11 in the case of the smaller input current is less than the power consumption Pf of the switch M12. Therefore, in the case of the smaller input current, it is more efficient to use the switch M11. On the contrary, the power consumption Pg of the switch M11 in the case of the larger input current is more than the power consumption Ph of the switch M12. Therefore, in the case of the larger input current, it is more efficient to use the switch M12. Thus, also in the case of taking into account PSW, when the amount of the input current changes from the smaller value to the larger value, the power consumption caused by the switch can be suppressed by switching the switch to be used from the switch M11 to the switch M12.

Consequently, by switching the switch to the appropriate switch based on the amount of the input current, the power consumption can be suppressed.

The amount of the input current can be determined by measurement of a voltage and a resistance across a resistor which is connected to the switch or the load. However, there is a problem of power consumption at the resistor. In this embodiment, the switch to be used is switched to the appropriate switch based on the amount of the input voltage to the DC-DC converter.

The reason why the switch to be used is switched to the appropriate switch based on the amount of the input voltage is explained below. The power supply connected to the input unit of the DC-DC converter has an open voltage and internal impedance that are known in advance. And the DC-DC converter adjusts the input voltage from the power supply to gain the maximum voltage based on the maximum power transfer theorem. The maximum power transfer theorem means that it can supply a maximum power to the external impedance when the internal impedance is equal to the external impedance (the load impedance). Thus the DC-DC converter sets the input voltage to half of the open voltage, and supplies the maximum voltage.

Figure 4:
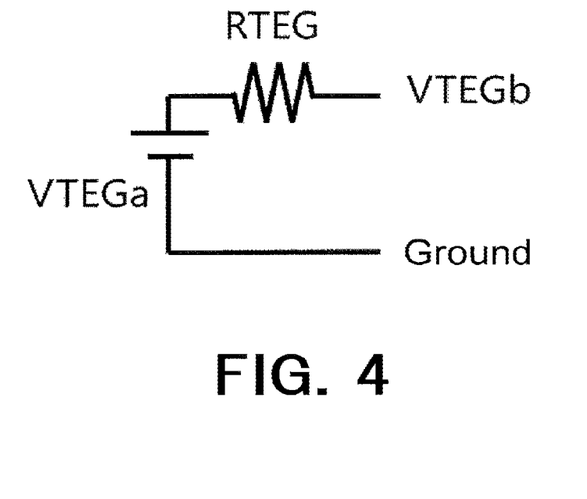
FIG. 4 is a diagram showing an equivalent circuit of a thermoelectric generator.

It is assumed that the power supply connected to the DC-DC converter is a thermoelectric generator. The thermoelectric generator is an element from which electric power can be taken out, when there is a difference in temperature between a front surface and a back surface of the element. FIG. 4 is a diagram showing an equivalent circuit of a thermoelectric generator. The open voltage of the thermoelectric generator is set to VTEGa. The internal resistance is set to RTEG. The output voltage is set to VTEGb. According to Thevenin's theorem, the equivalent circuit of the power supply is described as a series connection of the voltage source and the impedance. In the case of a thermoelectric generator especially, the impedance can be described as a resistor not including an inductance and a capacitance.

The internal resistance RTEG of the thermoelectric generator is determined by the element to be used, and is known. The DC-DC converter adjusts VTEGb by adjusting the switching frequency for ON-OFF or the ratio of ON-OFF of the switch to set VTEGb to a half of VTEGa. The ratio of ON-OFF of the switch is ratio of ON time to OFF time per period.

If the input voltage is a half of the open voltage of the power supply, the input current input to the DC-DC converter is indicated by I=(VTEGa−VTEGb)/RTEG= (2VTEGb−VTEGb)/RTEG=VTEGb/RTEG. So the input current can be calculated from VTEGb and RTEG. Thus, the input current can be calculated by measurement of VTEG. Therefore, the switch to be used is switched to the appropriate switch based on not the input current but the input voltage.

The element to be used in this embodiment is the thermoelectric generator, yet any element whose internal impedance can be expressed as an internal resistance can be used. A power generator which generates an electromotive force caused by an external factor, for example a solar power generator, an oscillation power generator, and so on, can be used as the power supply as well as the thermoelectric generator.

Figure 5:
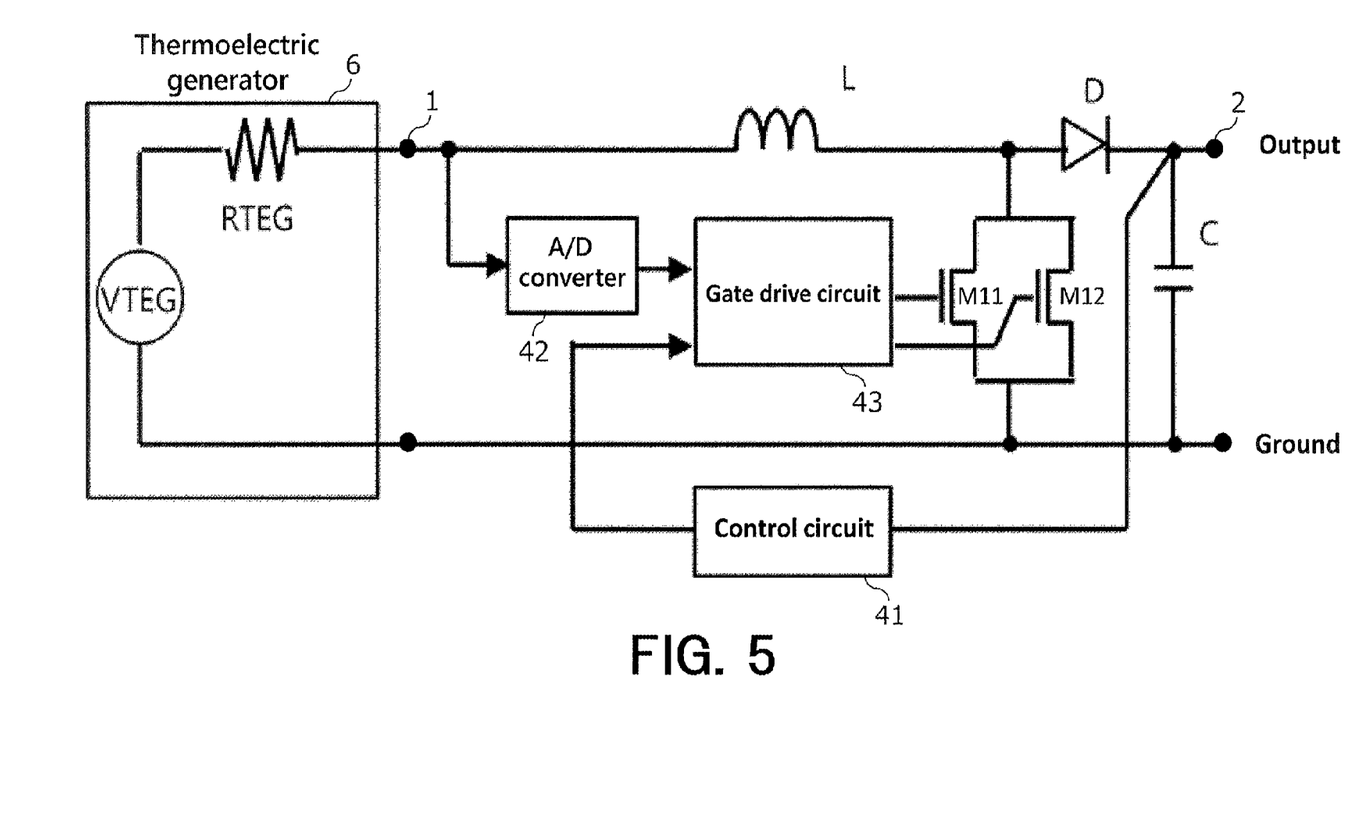
FIG. 5 is a diagram showing an example of a circuit configuration of a power supply device.

FIG. 5 is a diagram showing an example of a circuit configuration of a power supply device. The thermoelectric generator 6 having the open voltage and the internal resistance is connected to the DC-DC converter in this embodiment. As described in FIG. 5, the DC-DC converter in this embodiment may be connected to the power generator, and used as the power supply device.

As described above, in this embodiment, in the case that the open voltage and the internal resistance of the power supply are known as in thermoelectric generator, the DC-DC converter changes the connection of the switches reducing the power consumption of the semiconductor switches based on the input voltage by measurement of the input voltage to the DC-DC converter. Since the circuit does not have to measure an input voltage, the circuit does not have to connect a resistor to a current circuit. So the power consumption can be reduced, and the efficiency of the DC-DC converter can be improved.

The Second Embodiment

Figure 6:
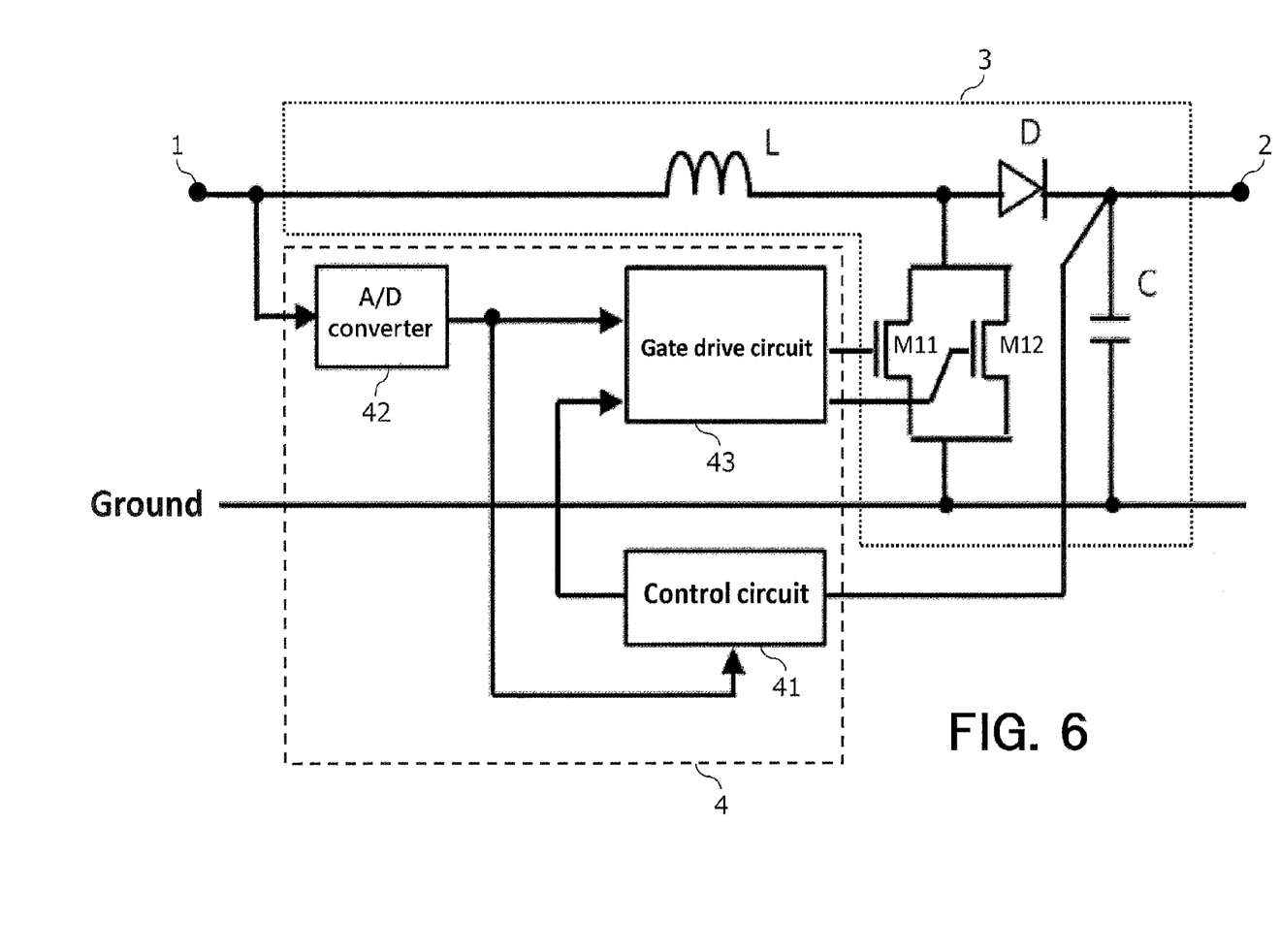
FIG. 6 is a diagram showing an example of a circuit configuration of a DC-DC converter according to a second embodiment.

FIG. 6 is a diagram showing an example of a circuit configuration of a DC-DC converter according to a second embodiment. This embodiment is different from the first embodiment in that the digital value output from the A/D converter 42 is input to not only the gate drive circuit 43 but also the control circuit 41. The explanation of same points as in the first embodiment is omitted below.

The control circuit 41 in this embodiment acquires the digital value of the input voltage from the A/D converter 42, and adjusts the frequency of ON-OFF control signal to be output. The gate drive circuit 43 that also acquires the ON-OFF control signal performs the switching operation of the switch M11 and the switch M12 in accordance with the frequency of ON-OFF control signal. In other words, the control circuit 41 adjusts the switching frequency based on the input voltage. And the control circuit 41 can reduce the driving loss (PDRI) by suppressing the switching frequency.

As explained in FIGS. 3(A), 3(B), the conduction loss (PCON) and the switching loss (PSW) increase with increasing of the input current, and the driving loss does not depend on the input current. Therefore, if the input current increases, PCON and PSW may be larger than PDRI. In that case, PDRI can be reduced by lowering the switching frequency. Then the power consumption of the switches can be reduced. PCON increases with lowering the switching frequency, however, PDRI and PCON are in the relationship of a trade-off. By calculating each loss of the switches by circuit simulation, the switching frequency can be adjusted by using a prepared lookup table in advance.

As described above, the DC-DC converter in this embodiment adjusts the ON-OFF time of the switches based on the input voltage, and lowers the switching frequency while increasing the prescribed output voltage. Thereby power consumption of the DC-DC converter can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A DC-DC converter, comprising:
    an input that inputs an input voltage;
    an output that outputs an output voltage;
    a conversion circuit including a plurality of semiconductor switches, that converts the input voltage to the output voltage by switching operation of one or more semiconductor switches of the plurality of semiconductor switches; and
    a switch control circuit that selects the one or more semiconductor switches which perform the switching operation from the plurality of semiconductor switches based on only the input voltage by referring to a lookup table indicating a correspondence between the input voltage and the one or more semiconductor switches to be controlled, and that controls the switching operation of the selected one or more semiconductor switches.

2. The DC-DC converter according to claim 1, wherein the lookup table is used for selecting one or more of the semiconductor switches to be turned on to minimize power consumption based on the power consumption of each of the semiconductor switches or a combination of the semiconductor switches to which an input current is calculated from an open voltage and an internal impedance of a power source connected to the input and the input voltage is input.

3. The DC-DC converter according to claim 1, wherein the switch control circuit includes:
a control circuit that generates a control signal based on the output voltage,
a converter that generates a digital signal based on the input voltage, and
a gate drive circuit that turns on and off each of the semiconductor switches based on the control signal, the digital signal, and the lookup table.

4. The DC-DC converter according to claim 3, wherein
the control circuit sets a frequency of the switching operation based on the input voltage and a predetermined frequency corresponding to the input voltage, and
the switch control circuit controls the semiconductor switches based on the frequency of the switching operation.

5. A method for DC-DC converting, comprising:
inputting an input voltage;
outputting an output voltage;
converting the input voltage to the output voltage by switching operation of one or more semiconductor switches of a plurality of semiconductor switches; and
selecting the one or more semiconductor switches which perform the switching operation from the plurality of semiconductor switches based on only the input voltage by referring to a lookup table indicating a correspondence between the input voltage and the one or more semiconductor switches to be controlled, and controlling the switching operation of the one or more semiconductor switches.

6. The method for DC-DC converting according to claim 5, further comprising:
generating a control signal based on the output voltage;
generating a digital signal based on the input voltage; and
turning on and off each of the semiconductor switches based on the control signal, the digital signal, and the lookup table.

7. The method for DC-DC convening according to claim 6, further comprising:
setting a frequency of the switching operation based on the input voltage and a predetermined frequency corresponding to the input voltage; and
controlling the semiconductor switches based on the frequency of the switching operation.

8. The method for DC-DC converting according to claim 5, wherein
the lookup table is used for selecting one or more of the semiconductor switches to be turned on to minimize power consumption based on the power consumption of each of the semiconductor switches or a combination of the semiconductor switches to which an input current is calculated from an open voltage and an internal impedance of a power source connected to an input unit and the input voltage is input.

* * * * *